United States Patent [19]

Cassady, Jr. et al.

[11] Patent Number: 4,865,232
[45] Date of Patent: Sep. 12, 1989

[54] STANDPIPE SUPPORT FOR FLEXIBLE TUBE

[75] Inventors: Henry W. Cassady, Jr., Santa Cruz; Richard E. Hanset, Scotts Valley; James W. Livingston, Santa Cruz; Gary D. Moreland, Santa Cruz, all of Calif.

[73] Assignee: Beta Technology, Inc., Santa Cruz, Calif.

[21] Appl. No.: 163,381

[22] Filed: Mar. 2, 1988

[51] Int. Cl.⁴ .................. A62C 23/04; B05B 15/06; B67D 5/60
[52] U.S. Cl. .................. 222/464; 222/23; 222/382; 248/75; 248/79; 403/377
[58] Field of Search ............... 222/173, 382, 464, 211, 222/74, 23; 403/377, 373; 248/75, 79; 137/590, 592

[56] References Cited

U.S. PATENT DOCUMENTS

| Re. 26,012 | 5/1966 | Green | 222/464 X |
| 2,591,427 | 4/1952 | Harkey | 248/79 |
| 2,858,590 | 11/1958 | Koch | 248/79 X |
| 3,153,453 | 10/1964 | Huthsing, Jr. | 169/30 |
| 3,251,069 | 5/1966 | Clark | 248/75 X |
| 3,911,504 | 10/1975 | Koket | 248/75 X |
| 4,111,575 | 9/1976 | Hoshino | 403/377 X |

FOREIGN PATENT DOCUMENTS 582724 9/1958 Italy .................. 222/211

Primary Examiner—Kevin P. Shaver
Attorney, Agent, or Firm—Flehr, Hohbach, Test, Albritton & Herbert

[57] ABSTRACT

A tube holder is disclosed for use in a system for transferring fluid products from a container via a continuous flexible tube. The tube holder is a lightweight, relatively rigid support having a length corresponding to the length of the container, and a substantially C-shaped cross section so that the tube easily snaps into the support. These supports can be produced using extruded PVC. The tube holder also preferably includes a sleeve member at one end for retaining the tube. To facilitate identification of which tubes are to be used with various different chemicals, a multiplicity of differently colored sleeve members may be provided.

12 Claims, 2 Drawing Sheets

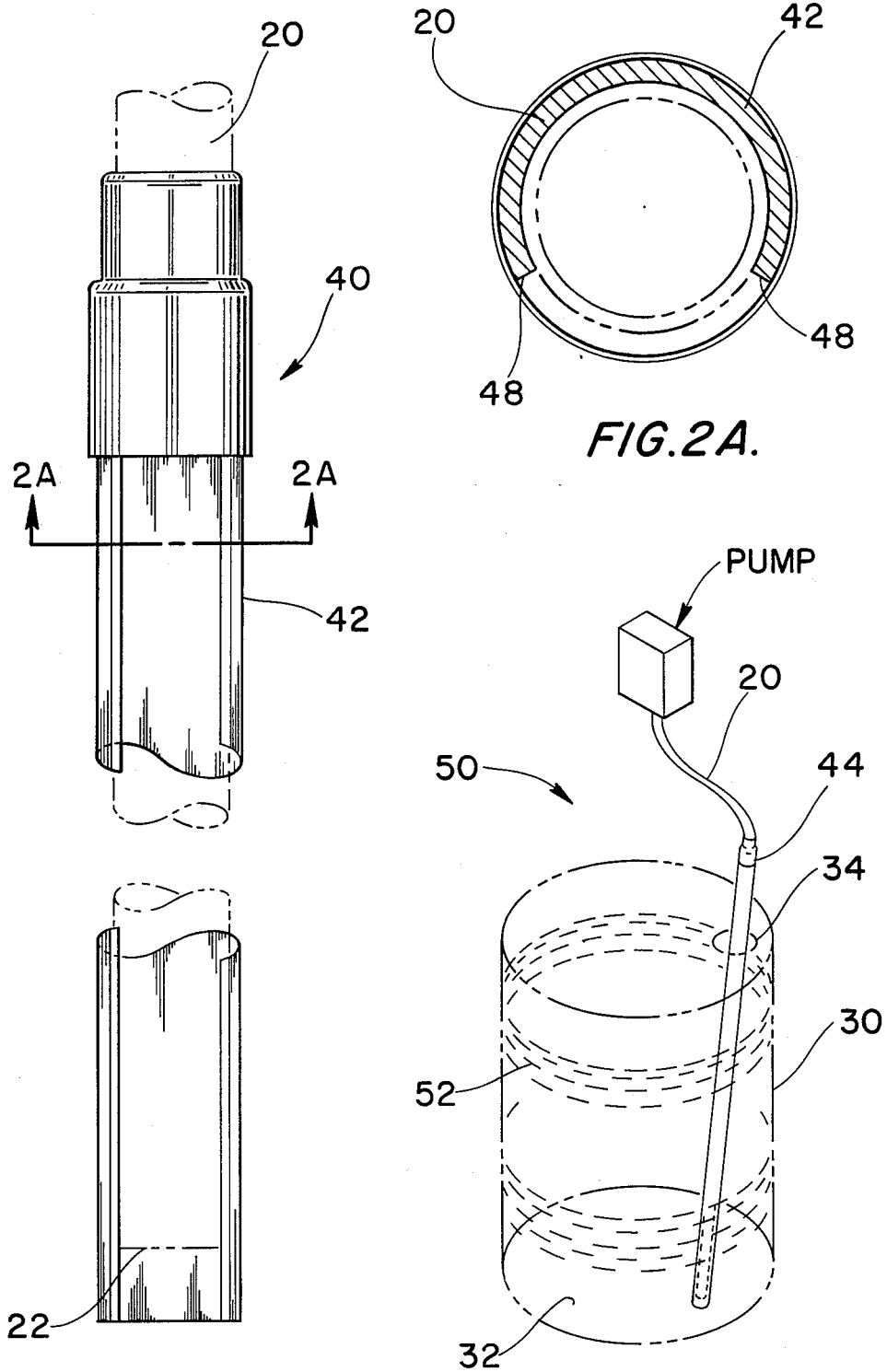

STANDPIPE SUPPORT FOR FLEXIBLE TUBE

The present invention relates generally to systems for transferring fluid products from a container via a continuous flexible tube, and particularly to a rigid standpipe support for holding a flexible tube in a fluid products container.

BACKGROUND OF THE INVENTION

In a wide range of chemical delivery systems, fluid products are pumped from a container through a flexible tube. In spite of the increasingly sophisticated pumps and monitoring systems used in such chemical delivery systems, a minor but persistent problem has been the lack of an inexpensive and convenient tube holder for holding the bottom of the flexible tube close to the bottom of the container.

FIG. 1 shows a typical prior art tube holder 10. This particular tube holder 10 is a cylindrically shaped hard tube 12, and has a beveled lower edge 14. As show, this tube holder has an inner diameter substantially larger than the outer diameter of the tube 20 which it holds. This is typical of the prior art tube holders, and allows the tube holder 10 to hold more than one tube 20.

In this example, and as is typical in chemical distribution systems, the tube holder 10 has a length comparable to the height or size of the container 30 in which it is expected to be used, so that the tube 20 and tube holder 10 are easily inserted and withdrawn through an orifice 34 at the top of the container.

An important attribute of tube holders is that they should be designed to hold the bottom orifice 22 of the tube 20 close to but not against the bottom 32 of a container 30 so that the tube 20 can be used to draw substantially all of the contents of the container 30 - but not so close that the bottom orifice 22 of the tube contacts the bottom 32 of the container and is thereby blocked from drawing fluid. In the example shown in FIG. 1, the tube holder 10 has a strap or band 16 for holding the tube 20 in place (i.e., to prevent the tube 20 from slipping relative to the position of the tube holder 10). In addition, the beveled edge 14 of the tube holder 10 is designed to ensure that when the tube holder is in contact with the bottom of a container, the bottom orifice of the tube will not be prevented from drawing the fluid in the container 30.

FIG. 1A shows a cross section of the tube holder 10 as designated by line A—A in FIG. 1.

While the tube holder 10 shown in FIG. 1 is adequate for its intended purpose, it suffers from at least three deficiencies. First, it is inconvenient to use because the strap 16 must be adjusted or tightened when installing a new tube 20 in the holder. Second, the tube holder 10 is much wider than the tube 20, which poses a problem when several tubes must be used to draw fluid from a single container that has only a small opening 34 in its top. It is also a problem when several tubes with different diameters are being used. The typical solution is to try to put more than one tube 20 in a single holder 10, but this has the disadvantage that the user must often improvise or experiment with tube holders of different diameters until a combination is found that enables all of the tubes to be inserted into the container 30.

Third, tube holders such as the one in FIG. 1 increase the amout of surface area in contact with the fluid in the container 30, and therefore increase the amount of fluid which is unintentionally withdrawn from the container 30 whenever the tube holder 10 is removed from the container. The amount of such unintentionally withdrawn fluid increases with the viscosity of the fluid. Furthermore, any increase in the amount of chemicals which may drip on the floor or make contact with surfaces outside the container is undesirable, especially when the chemicals are unpleasant or dangerous.

Finally, the tube holders used in the prior art are generally too expensive, typically costing close to a dollar to manufacture a two foot tube holder.

It is therefore an object of the preset invention to provide an improved tube holder for chemical distribution systems.

Another object of the present invention is to provide a tube holder which is convenient to use and is as easy to use when using several tubes of varying diameters as when using several tubes of equal diameter. Further objects of the present invention include providing a tube holder which does not substantially increase the surface area in contact with the fluids in a container, and providing a tube holder which is substantially lower in cost that those in the prior art.

SUMMARY OF THE INVENTION

In summary, the present invention is an improved tube holder for use in a system for transferring fluid products from a container via a continuous flexible tube. The improved tube holder is a lightweight, relatively rigid support having a length corresponding to the size of the container, and a substantially C-shaped cross section so that the tube easily snaps into the support. The tube holder also preferably includes a member at one end for retaining the tube.

BRIEF DESCRIPTION OF THE DRAWINGS

Additional objects and features of the invention will be more readily apparent from the following detailed description and appended claims when taken in conjunction with the drawings, in which:

FIG. 2 depicts a preferred embodiment of a tube holder in accordance with the present invention, and FIG. 2A depicts a cross section view of the tube holder in FIG. 2.

FIG. 3 is a perspective view of a system for transferring fluids from a container, using the tube holder of FIG. 2.

DESCRIPTION OF THE PREFERRED EMBODIMENT

Figures 1, 1A:
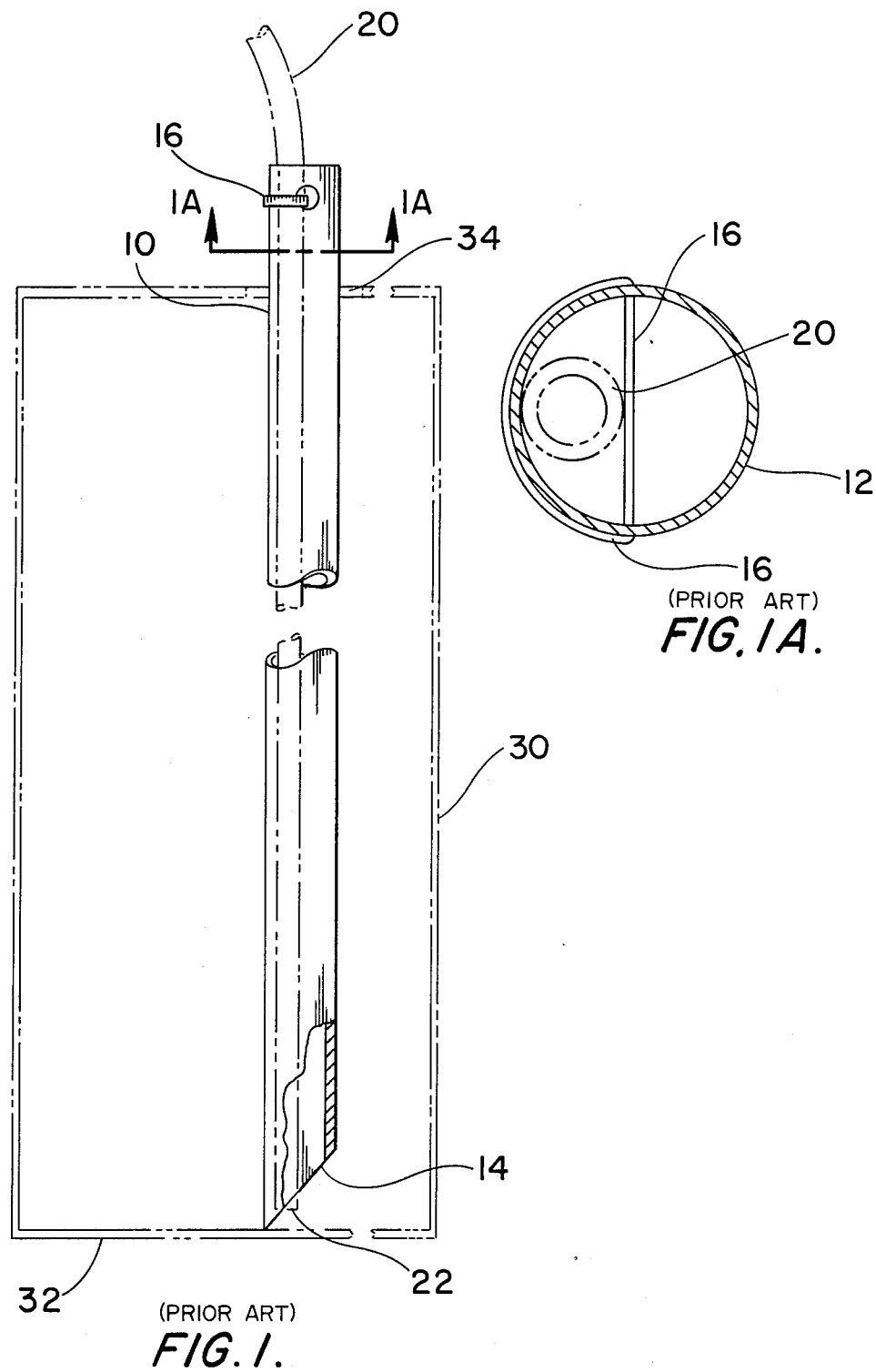
FIG. 1 depicts a typical prior art tube holder as used in a chemical delivery system.
FIG. 1A is a cross section view of the tube holder in FIG. 1.

Referring to FIG. 2, there is shown a preferred embodiment of a tube holder 40 in accordance with the present invention. The tube holder 40 has two components: a relatively rigid support 42 surrounding and in contact with at least half of the surface area of a flexible tube 20, and a retaining member 44 at one end for retaining the tube 20 at a fixed position relative to the support 42.

Referring to the cross section view shown in FIG. 2A, the support 42 is a C-shaped plastic member having an interior surface with a diameter corresponding to the outer diameter of the continuous flexible tube 20.

In the preferred embodiment the support 42 has a semicircular or substantially C-shaped cross section subtending an arc of approximately 240 degrees. More generally, the support 42 should be shaped so that the tube 20 "snaps" into the tube holder 40. The tube 20 is held in place by virtue of the shape of the support 42, which makes the tube holder 40 easy to use. Thus the support 42 should have either a semi-circular cross section, or a rounded V-shaped cross section, subtending an arc between 200 and 300 degrees—so that the support 42 surrounds the tube enough to securely hold it, but has a sufficiently large opening 48 running the length of the support 42 so that a tube 20 can be readily inserted and removed.

In embodiments of the invention which are more V-shaped than the embodiment shown in FIGS. 2 and 2A, the interior surface of the support 42 may contact the tube 20 only at a few points (rather than being in continuous contact with at least half of the surface area of the tube). This is mentioned because the most important feature of the support 42 is that the tube 20 is retained in place by the "snap in" shape of the support, which is herein defined as "a substantially C-shaped cross section."

The support 42 is produced by extruding PVC (polyvinyl chloride) through an appropriately shaped die, which is an extremely low cost manufacturing method. PVC is preferred because it is inexpensive, lightweight and chemically resistant (i.e., it doesn't react with a wide range of chemicals) and because while it is relatively rigid compared to standard flexible tubes it is sufficiently flexible that tubes can be readily inserted and removed through the opening 48 running the length of the support. Tube supports for a variety of tube sizes are made simply by extruding PVC through correspondingly sized die. In some situations, the support 42 may be made from extruded CPVC or polypropylene.

In the preferred embodiment, the retaining member 44 consists essentially of a vinyl sleeve for surrounding and holding together one end of the support 42 and a continuous flexible tube 20 inserted therein. The vinyl sleeve 44 is preferably a uniform diameter sleeve with sufficient stretch to snugly fit over the tube 20 and to snugly fit over the support 42 (also called an interference fit).

It is often useful to be able to easily identify or distinguish between the various tubes being used in a particular application. Vinyl sleeves are easily manufactured in a variety of colors, and the tube holders in the preferred embodiment are supplied with vinyl sleeves having a multiplicity of distinct colors. Using differently colored sleeves to identify the different chemicals to be used with distinct ones and/or groups of tubes has been found by the inventors to be an added benefit of the present invention. In other words, using color coded vinyl sleeves on tubes, and similarly color coded tape on chemical containers (or even by affixing color coded sleeves onto the containers), helps make it clear which tubes go in which containers of chemicals.

As shown in FIG. 3, which depicts a system 50 for transferring fluid 52 from a container 30, the rigid support 42 has a length corresponding to the height or length of the container 30. The tube 20 is typically inserted into its support 42 so that the bottom orifice 22 of the tube is above the end of the support 42 (see FIG. 2). This placement ensures that when the end of the support 42 touches the bottom of the container 32, the support will hold the bottom orifice 22 of the tube 20 close to but not against the bottom 32 of a container 30. In this way the tube 20 can be used to draw substantially all of the contents of the container 30—but is not held so close that the bottom 32 of the container that the tube is blocked from drawing fluid.

As can be seen from the Figures, it is extremely easy to use the tube holder made in accordance with the present invention, in part because it is easy to insert a tube in the support 42 and to select and fix the position of its bottom orifice relative to the end of the support 42. Another advantage of the present invention is that the tube holders do not occupy much space—which makes it easy to insert two or even a multiplicity of tubes into a single container with a narrow neck or access orifice, even if several tubes of different sizes are being used (in which case each tube holder 40 will be sized in accordance with the outer diameter of its corresponding tube 20).

Still another advantage of the tube holder 40 of the present invention is that it increases the surface area of the tube 20 being used much less than the prior art tube holders- which decreases the amount of fluids inadvertently removed from containers 30 whenever the tube 20 and its holder 40 are withdrawn from the container 30. Finally, the tube holders made in accordance with the present invention are extremely inexpensive to make—typically one third of the cost of tube holders such as the one shown in FIG. 1.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A support apparatus for holding a continuously flexible tube while transferring fluid products from a container via the continuous flexible tube, said support apparatus comprising a relatively rigid support having a predefined length of at least the height of the container, said support having a substantially C-shaped cross section for partially surrounding the tube and having an opening running the length of said support so that the tube can snap into and be held in place inside said support, and a retaining means surrounding the support at one end thereof for retaining the support against the tube.

2. The support apparatus as set forth in claim 1, said retaining means consisting essentially of a vinyl sleeve.

3. The support apparatus as set forth in claim 1, said relatively rigid support comprising a plastic, chemically resistant member having a partially enclosed interior with a cross section subtending an arc of between 200 and 300 degrees.

4. The support apparatus as set forth in claim 1, for use in a system having color coded containers of chemicals, said retaining means consisting essentially of a color coded vinyl sleeve.

5. In a system for transferring fluid products from a container via a continuous flexible tube, the improvement comprising a relatively rigid support partially surrounding and in contact with more than half of the surface area of the tube, said rigid support having a predefined length of at least the depth of the container, an opening running the length of said support for inserting the tube in said support, and a retaining means surrounding the support at one end thereof for retaining the support against the tube.

6. In the system as set forth in claim 5, said support comprising a substantially C-shaped plastic member having an interior surface with a diameter corresponding to the outer diameter of the continuous flexible tube.

7. In the system as set forth in claim 6, said retaining means consisting essentially of a vinyl sleeve surrounding and holding together one end of said support and a continuous flexible tube inserted therein.

8. In the system as set forth in claim 6, said substantially C-shaped plastic member having a cross section subtending an arc of between 200 and 300 degrees.

9. In the system as set forth in claim 5, the system having color coded containers of chemicals, said retaining means consisting essentially of a color coded vinyl sleeve.

10. In a system for transferring fluid products, the combination comprising: a container for holding fluid products, a continuous flexible tube within the container, a relatively rigid support partially surrounding and in contact with more than half of the surface area of the tube, said rigid support having a predefined length of at least the depth of the container and an opening running the length of said support for inserting the tube in said support, and a member surrounding the support at one end thereof for retaining the support against the tube.

11. The system set forth in claim 10, said support comprising a substantially C-shaped plastic member having an interior surface with a diameter corresponding to the outer diameter of the tube.

12. The system set forth in claim 10, said system including a plurality of color coded containers, said retaining member consisting essentially of a color coded vinyl sleeve.

* * * * *